(12) United States Patent
Feng et al.

(10) Patent No.: US 10,483,861 B1
(45) Date of Patent: Nov. 19, 2019

(54) FLYBACK CONVERTER CONTROLLER WITH SINGLE PIN DETECTION OF OVER-VOLTAGE AND AUXILIARY WINDING FAULTS

(71) Applicant: DIALOG SEMICONDUCTOR INC., Campbell, CA (US)

(72) Inventors: Guang Feng, Campbell, CA (US); Jiang Yu, Campbell, CA (US); Qifeng Shi, Campbell, CA (US); Qiu Sha, Campbell, CA (US); Xiaolin Gao, Campbell, CA (US); Yong Xiong Lin, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/119,108

(22) Filed: Aug. 31, 2018

(51) Int. Cl.
*H02M 3/335* (2006.01)
*H02M 1/36* (2007.01)

(52) U.S. Cl.
CPC .......... *H02M 3/33569* (2013.01); *H02M 1/36* (2013.01)

(58) Field of Classification Search
CPC ......... H02M 3/33507; H02M 3/33523; H02M 3/33561; H02M 3/33569; H02M 3/33576; H02M 3/33592; H02M 2001/0032; Y02B 70/1433; Y02B 70/1475
USPC ............................................. 363/21.01–21.18
See application file for complete search history.

(56) References Cited

U.S. PATENT DOCUMENTS

| | | | | |
|---|---|---|---|---|
| 9,397,550 | B2 * | 7/2016 | Huang | .................... H02H 5/042 |
| 10,103,636 | B1 * | 10/2018 | Gao | .................... H02M 3/33515 |
| 2013/0121044 | A1 * | 5/2013 | Gao | ........................ H02M 1/32 363/50 |
| 2014/0268919 | A1 * | 9/2014 | Yao | .................... H02M 3/33523 363/21.15 |

* cited by examiner

*Primary Examiner* — Yemane Mehari
(74) *Attorney, Agent, or Firm* — Haynes & Boone, LLP (57) ABSTRACT

A flyback converter controller is provided with a single terminal through which the flyback converter controller senses for over-voltage faults for an input voltage and also senses for open circuit faults for an auxiliary winding. A first voltage divider provides a divided version of the input voltage to the single terminal. The controller compares a voltage for the single terminal to at least one over-voltage threshold to detect the over-voltage fault for the input voltage.

16 Claims, 6 Drawing Sheets

FLYBACK CONVERTER CONTROLLER WITH SINGLE PIN DETECTION OF OVER-VOLTAGE AND AUXILIARY WINDING FAULTS

TECHNICAL FIELD

This application relates to switching power converter controllers, and more particularly to flyback converter having a single pin detection of over-voltage and auxiliary winding faults.

BACKGROUND

The high efficiency of switching power converters such as a flyback converter has led to their virtual universal adaption as the battery charger for mobile devices. Since a flyback converter converts AC household voltage, fault conditions such as too much voltage across the power switch (designated as an over-voltage fault) may be potentially dangerous. It is thus conventional for a flyback converter controller to monitor for various fault conditions. Should the controller detect the presence of a fault condition, it stops cycling the power switch and enters a re-startup period. Upon the conclusion of the re-startup period, the controller may again resume normal operation.

Figure 1:
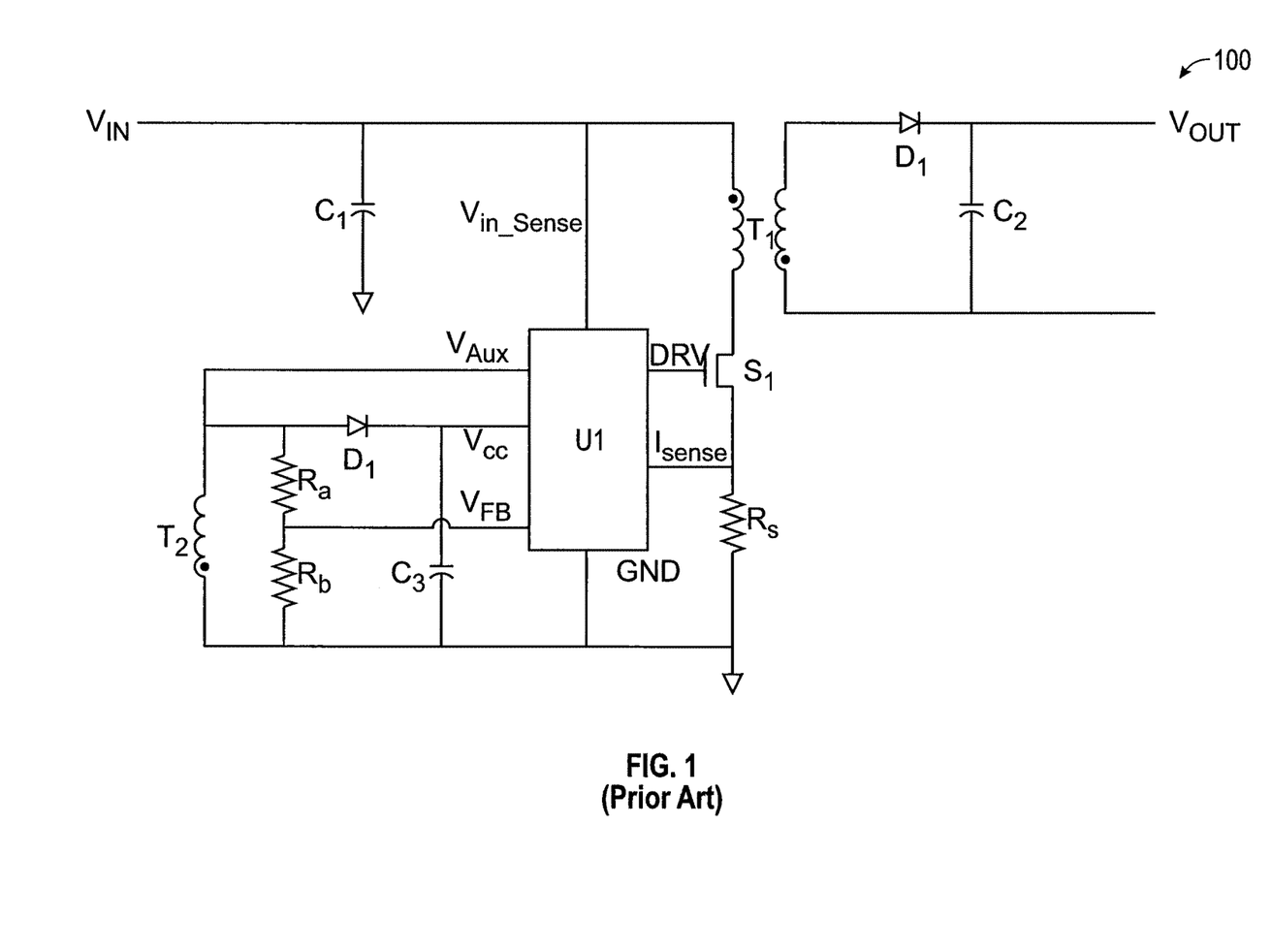
FIG. 1 illustrates a conventional flyback converter in which the controller requires a pair of terminals to monitor for over-voltage and auxiliary winding faults.

One type of fault relates to the auxiliary winding. In primary-only feedback techniques, the controller modulates the cycling of the power switch cycling responsive to a feedback voltage obtained from the auxiliary winding to regulate the output voltage. If the controller's connection to the auxiliary winding has an open-circuit fault, the feedback voltage will be too low such that the controller will drive the output voltage out of regulation and perhaps dangerously high. It is thus conventional for the controller to monitor an auxiliary winding T2 through a dedicated auxiliary winding terminal (V_Aux) as shown in FIG. 1 for a primary-side controller U1 in a conventional flyback converter 100. A rectified input voltage V_IN as smoothed by an input capacitor C1 drives a magnetizing current through a primary winding of a transformer T1 when controller U1 switches on a power switch transistor S1 through a drive voltage DRV applied to the gate of power switch transistor S1. Controller U1 monitors the primary winding current by sensing a voltage across a sense resistor Rs through an Isense terminal to switch power switch transistor S1 off when a desired peak primary winding current is satisfied. Controller U1 also has a ground (GND) terminal for coupling to ground.

Figure 2:
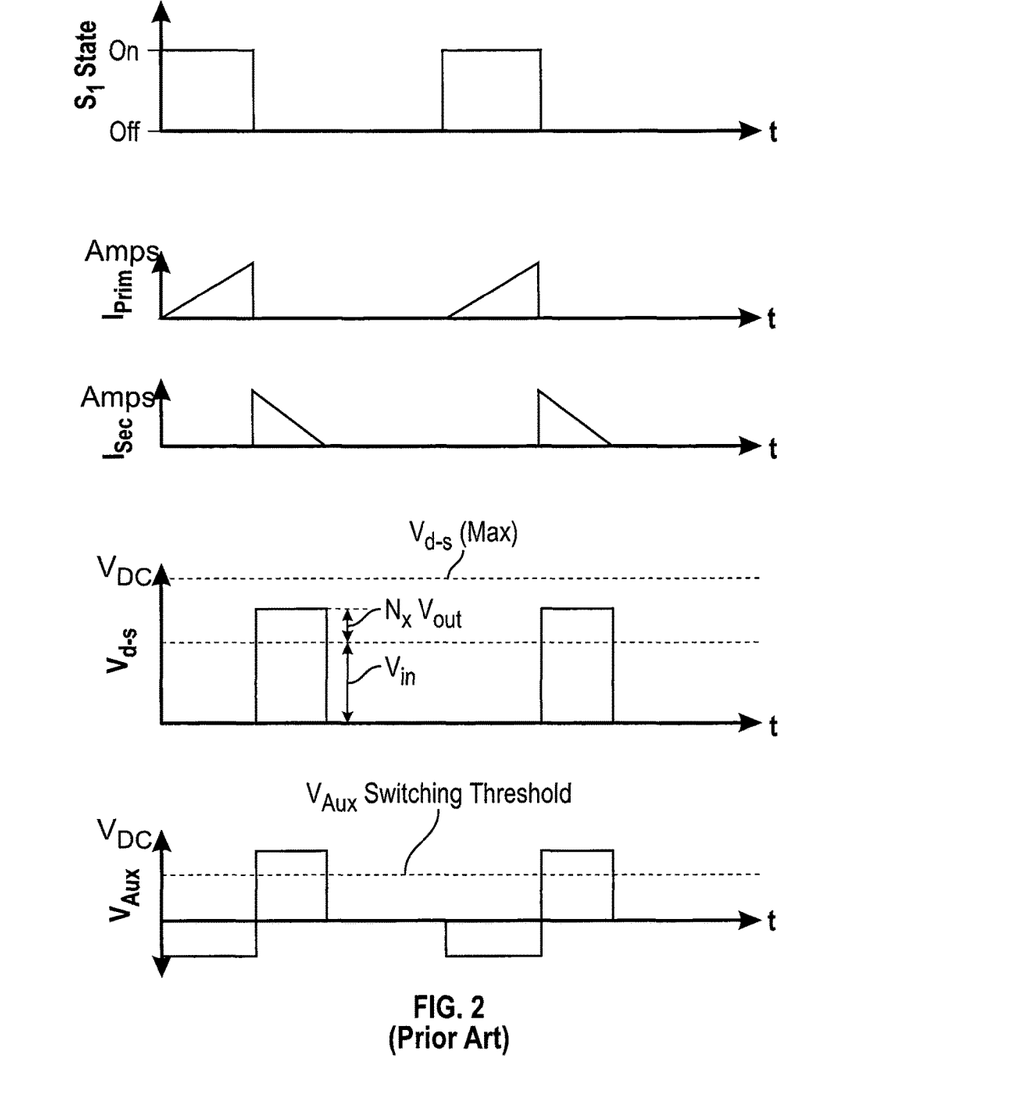
FIG. 2 illustrates some waveforms for the conventional flyback converter of FIG. 1.

Referring now to FIG. 2 in conjunction with FIG. 1, the primary winding current (I_prim) ramps up to the desired maximum value while power switch transistor S1 is on. During this on time, an output diode D1 prevents a secondary current (I_sec) from flowing. In synchronous rectification embodiments, output diode D1 would be replaced by a synchronous rectification switch. When controller U1 switches off power switch transistor S1, the primary winding current ceases whereas the second current spikes to a maximum value and then begins ramping down to zero. The point at which the secondary current ramps to zero is known as the transformer reset time and represents the ideal time for controller U1 to sense the output voltage V_OUT by sensing the reflected voltage on the auxiliary winding. To do so, controller U1 senses a feedback voltage through a feedback voltage (VFB) terminal connected to a voltage divider formed by a pair of resistors Ra and Rb that are in series with the auxiliary winding. The auxiliary winding voltage is also rectified through a diode D1 and stored on a capacitor C3 to produce a power supply voltage Vcc received by controller U1 on a Vcc terminal.

While the secondary current flows, a voltage Vd-s is impressed across the drain and source terminals for power switch transistor S1. The Vd-s voltage equals a sum of the input voltage V_IN and N*V_OUT, where N is the turn ratio for transformer T1. Controller U1 monitors the input voltage V_IN through a Vin_Sense terminal and can thus indirectly measure Vd-s since the V_OUT and the turn ratio N are both known. In this fashion, controller U1 can monitor whether Vd-s is excessively high so as to violate a Vd-s (MAX) threshold as shown in FIG. 2. Similarly, controller U1 monitors the Vaux terminal voltage to determine whether a Vaux switching threshold is satisfied. Should the Vaux terminal be properly coupled to the auxiliary winding without an open circuit fault, the Vaux terminal voltage drops to a negative voltage while power switch transistor S1 is on and then rises over the positive Vaux switching threshold in response to power switch transistor S1 switching off. The Vaux terminal voltage then drops to zero after the secondary winding current drops to zero to complete its behavior during a cycle of power switch transistor S1. Should the Vaux switching threshold not be crossed, controller U1 determines that the auxiliary winding is open-circuited to controller U1.

Although it is important to sense whether the input voltage is too high and whether the auxiliary winding has an open-circuit fault, detection of both fault conditions requires two separate terminal on the controller. Each required terminal for an integrated circuit increases manufacturing cost and complexity. Accordingly, there is a need in the art for a flyback controller that can monitor for over-voltage faults on the power switch and also monitor for open-circuit faults for the auxiliary winding without requiring two dedicated terminals.

SUMMARY

To address the need in the art for improved density and lower cost, a flyback converter is provided with a controller having single terminal through which the controller monitors for over-voltage faults and auxiliary winding open circuit faults. The single terminal receives a divided version of an input voltage through a common voltage divider and receives a divided version of an auxiliary winding voltage through the common voltage divider.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 3:
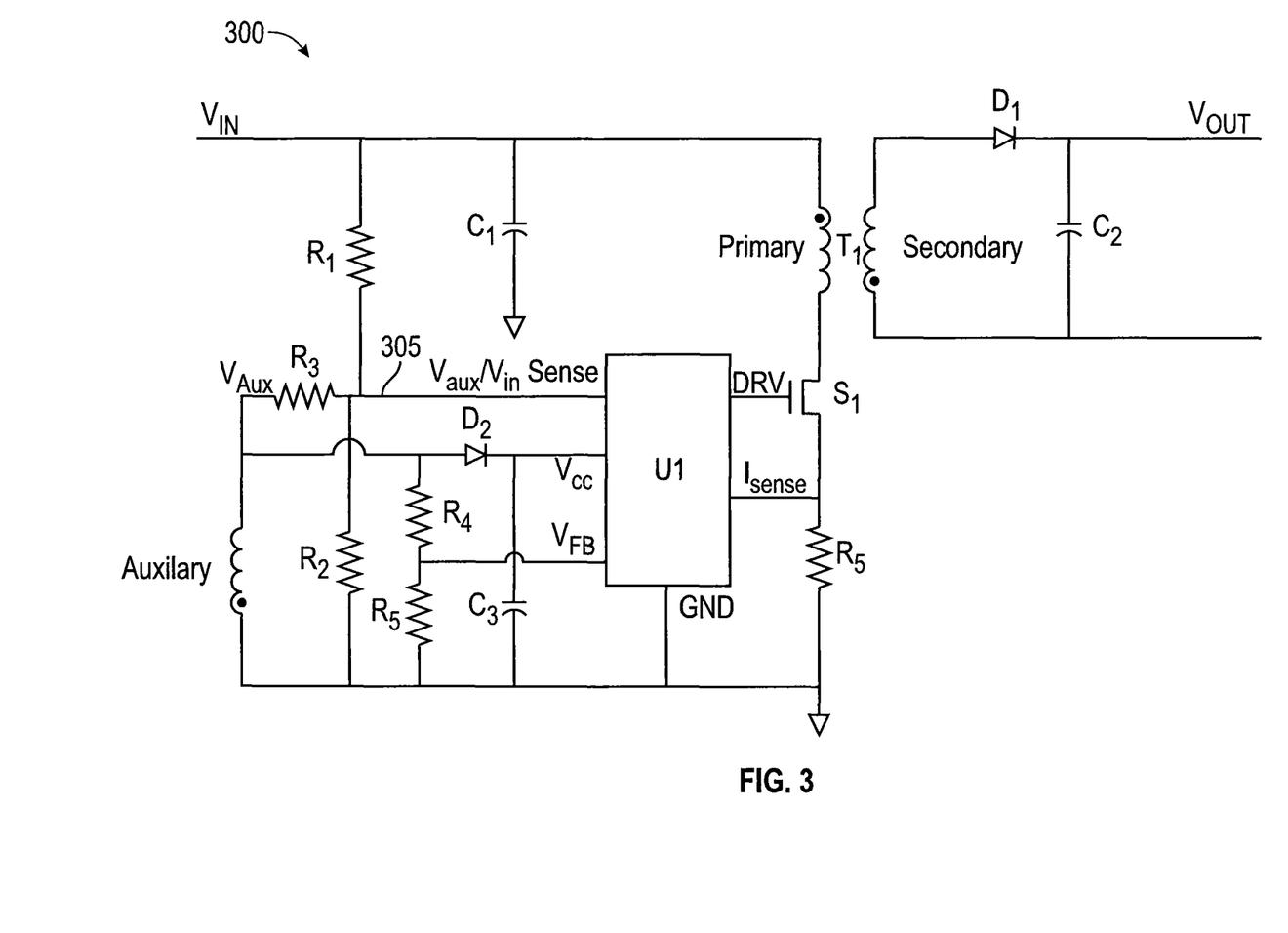
FIG. 3 illustrates a flyback converter in which the controller is configured to use a single Vaux/Vin Sense terminal to monitor for over-voltage and auxiliary winding faults in accordance with an aspect of the disclosure.

To reduce cost and increase density, a flyback controller is disclosed that detects over-voltage faults for the power switch transistor and also detects auxiliary winding open-circuit faults using a single terminal. An example flyback converter 300 including such an improved controller U1 is shown in FIG. 3. As discussed with regard to conventional flyback converter 100, a rectified input voltage V_IN as smoothed by an input capacitor C1 drives a magnetizing current through a primary winding of a transformer T1 when controller U1 switches on a power switch transistor S1 through a drive voltage DRV applied to the gate of power switch transistor S1. Controller U1 monitors the primary winding current by sensing a voltage across a sense resistor Rs through an Isense terminal to switch power switch transistor S1 off when a desired peak primary winding current is satisfied. Controller U1 also has a ground (GND) terminal for coupling to ground.

When controller U1 switches off power switch transistor S1, the primary winding current ceases whereas the secondary winding current spikes to a maximum value and then begins ramping down to zero. The point at which the secondary winding current ramps to zero is known as the transformer reset time and represents the ideal time for controller U1 to sense the output voltage V_OUT by sensing the reflected voltage on the auxiliary winding. To do so, controller U1 senses a feedback voltage through the VFB terminal connected to a voltage divider formed by a pair of resistors R4 and R5 that are in series with the auxiliary winding. The auxiliary winding voltage is also rectified through a diode D1 and stored on a capacitor C3 to produce a power supply voltage Vcc received by controller U1 on a Vcc terminal.

Figure 4:
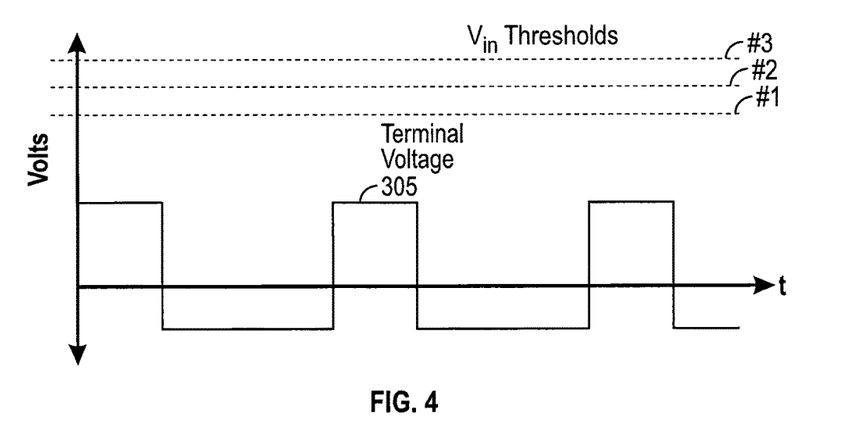
FIG. 4 illustrates a voltage waveform for the Vaux/Vin Sense terminal in the flyback converter controller of FIG. 3 while the input voltage is 0 volts.
Figure 5:
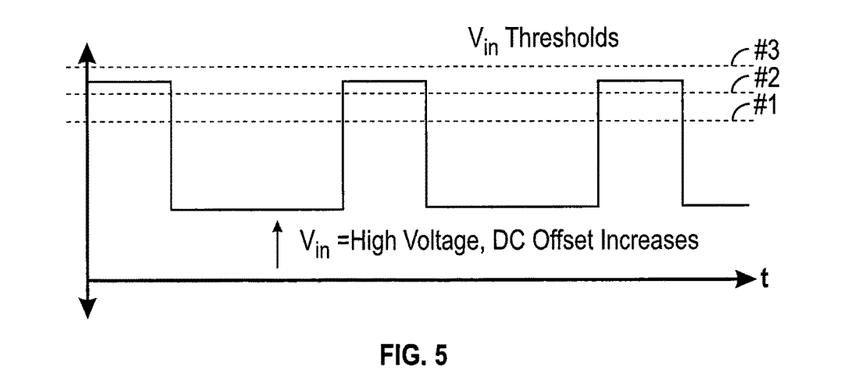
FIG. 5 illustrates a voltage waveform for the Vaux/Vin Sense terminal in the flyback converter controller of FIG. 3 during an over-voltage condition.

As also discussed with regard to conventional flyback converter 100, while the secondary winding current flows, a voltage Vd-s is impressed across the drain and source terminals for power switch transistor S1. The Vd-s voltage equals a sum of the input voltage V_IN and N*V_OUT, where N is the turn ratio for transformer T1. Controller U1 monitors the input voltage V_IN through a terminal 305 and can thus indirectly measure Vd-s since the output voltage V_OUT and the turn ratio N are both known. In particular, the input voltage rail carrying the input voltage V_IN couples through a resistor R1 to terminal 305, which in turn couples to ground through a resistor R2. Resistors R1 and R2 thus form a voltage divider to provide a divided version of the input voltage to terminal 305. In this fashion, controller U1 can monitor whether Vd-s is excessively high so as to violate a Vd-s (MAX) threshold such as discussed with regard to FIG. 2. But terminal 305 also functions so that controller U1 may monitor the terminal 305 voltage to determine whether a Vaux switching threshold is satisfied. To enable this monitoring, a resistor R3 couples between the auxiliary winding and terminal 305. Terminal 305 may thus be designated as the Vaux/Vin Sense terminal since its voltage is a function of the input voltage as well as the auxiliary winding voltage. In particular, the voltage V for terminal 305 is given by the following expression:

$$V = V\_IN * (R2 // R3)/(R1 + R2 // R3) + V\text{aux} * (R1 // R2)/(R3 + R1 // R2) \quad \text{Eq. (1)}$$

where R3 is greater than R2, and R1 is sufficiently greater than R2. Resistors R1, R2, and R3 thus form a common voltage divider for the auxiliary winding and input voltages. This common voltage divider divides the auxiliary winding voltage by a first voltage division factor and divides the input voltage by a second voltage division factor. A voltage waveform for terminal 305 when the input voltage V_IN is 0 volts is shown in FIG. 4. The voltage of terminal 305 pulses high while the secondary winding current (FIG. 2) flows. As the input voltage V_IN rises, the DC value for the terminal 305 voltage waveform will rise accordingly. To determine whether the voltage across the power switch transistor S1 could rise to a fault level, the terminal 305 voltage may be compared to one or more threshold voltages such as thresholds 1, 2, and 3. The terminal 305 voltage waveform is shown in FIG. 5 in which the input voltage has risen to an over-voltage condition. Both thresholds 1 and 2 are thus violated. The use of several thresholds enables controller U1 to determine the magnitude of the over-voltage condition. However, in alternative embodiments a single over-voltage threshold may be utilized.

Figure 6:
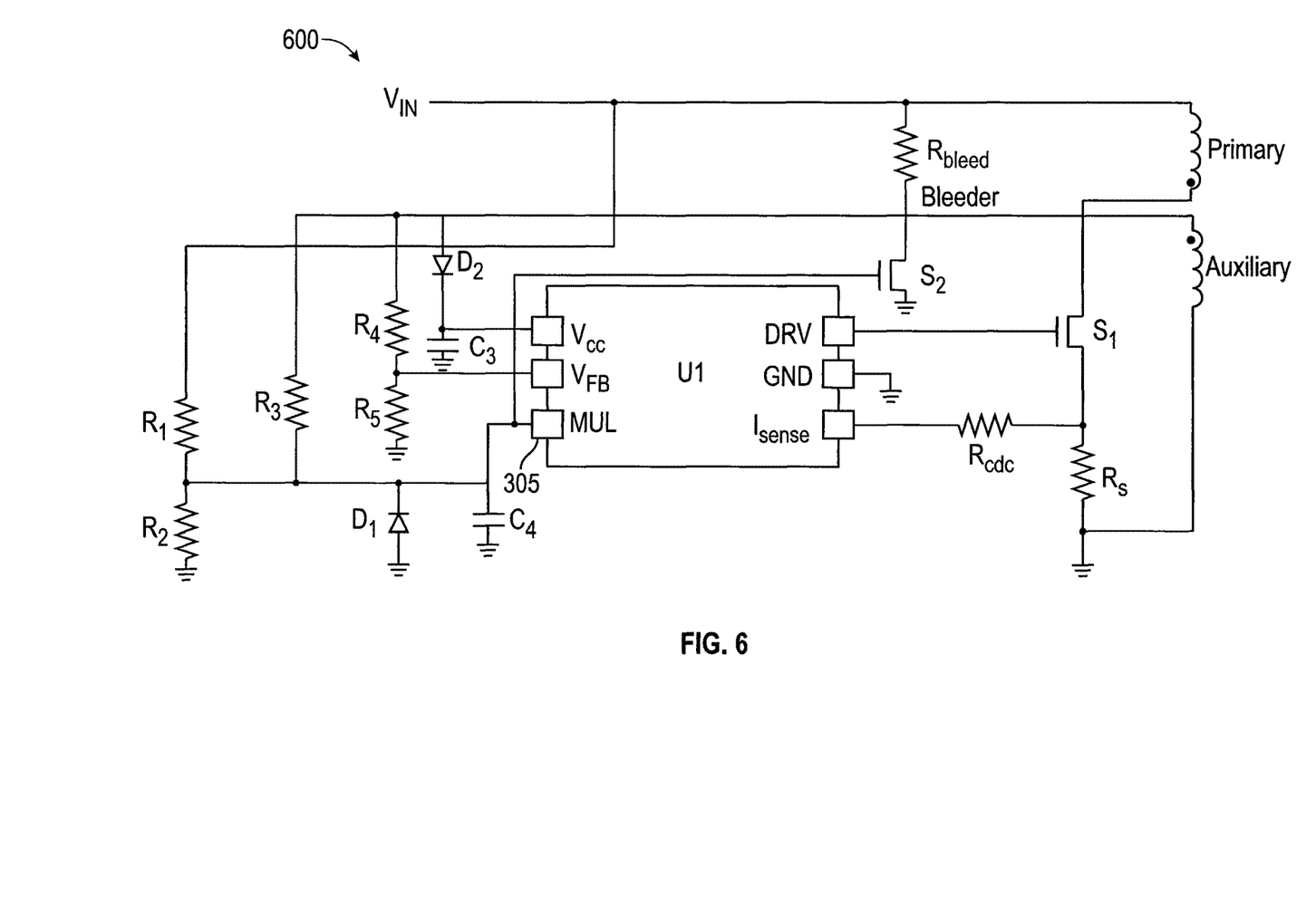
FIG. 6 illustrates a flyback converter in which the controller uses a multi-purpose terminal to monitor for over-voltage and auxiliary winding faults in accordance with an aspect of the disclosure.
Figure 7:
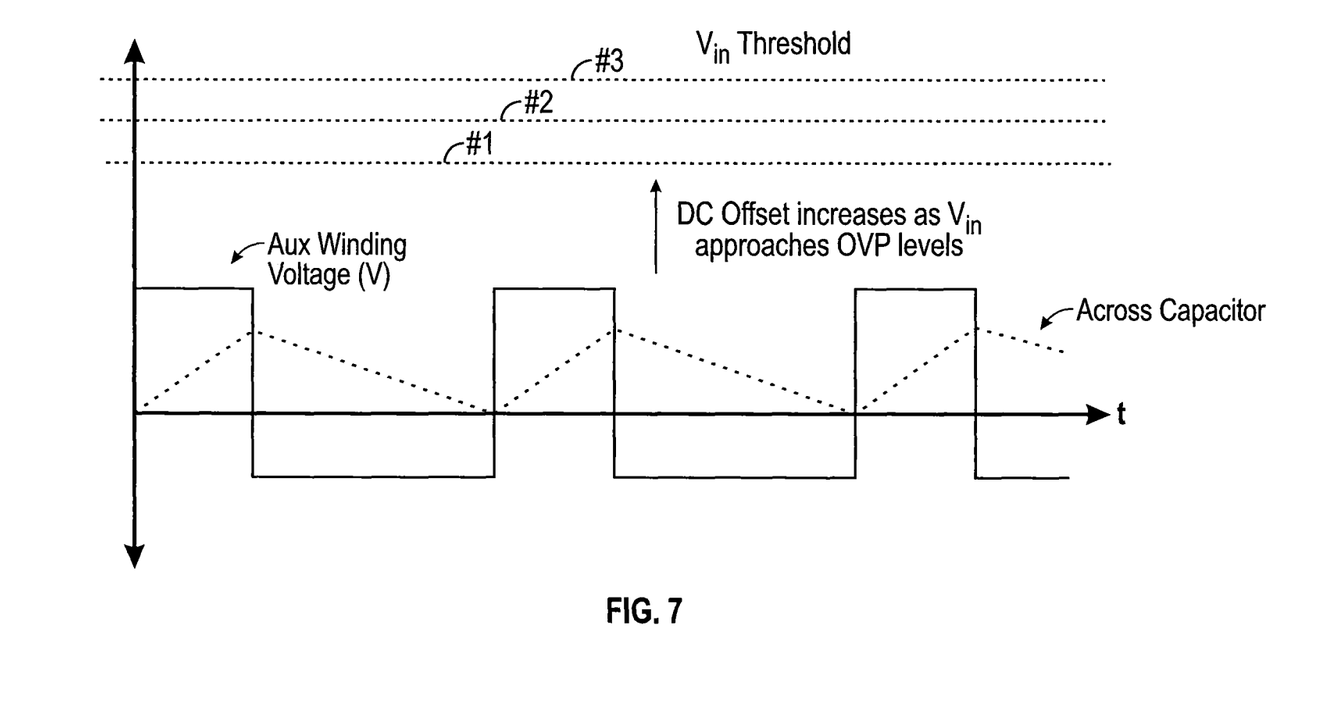
FIG. 7 a voltage waveform for the multi-purpose terminal in the flyback converter controller of FIG. 6 in accordance with an aspect of the disclosure.

Terminal 305 may be utilized for other functions such as shown for an example flyback converter 600 of FIG. 6. In particular, a multi-purpose (MUL) terminal is combined with terminal 305. Terminal 305 controls a bleeder switch transistor S2 that couples to the input voltage rail through a bleeder resistor Rbleed. The remaining components in flyback converter 600 are as described as with regard to flyback converter 300. However, the secondary side of the transformer is not shown in FIG. 6 for illustration clarity. In addition, a diode D3 is added between terminal 305 and ground to protect controller U1 from negative voltages. A capacitor C4 also couples between terminal 305 and ground to filter noise on the terminal 305 voltage. Referring again to FIGS. 4 and 5, the terminal 305 voltage may spike or ring when it transitions high. Such ringing could violate the over-voltage threshold(s) such that it would trigger a false over-voltage alarm. Capacitor C4 functions to filter out such noise on the transitions of the terminal 305 voltage to prevent false alarms. Capacitor C4 will smooth the square wave signals of FIGS. 4 and 5 into a saw-tooth wave as shown in FIG. 7, which improves the over-voltage detection.

The detection of the auxiliary winding open circuit fault may be performed by controller U1 at startup prior to the cycling of power switch transistor S1. After controller U1 powers up, it may apply a voltage (e.g. 5V) to terminal 305 by using the power supply voltage VCC. Should the auxiliary winding be open circuited to controller U1, the voltage applied to the terminal 305 is divided through a voltage divider formed by the serial combination of resistors R3, R4, and R5 to bring the voltage of the VFB terminal above an auxiliary winding fault threshold voltage (Vaux_th). Assuming a five volt application to terminal 305 during the auxiliary winding fault test, the values of resistors R3, R4, and R5 are then defined by the following expression:

$$5V * R5/(R3 + R4 + R5) \geq V\text{aux\_th} \quad \text{Eq. (2)}$$

Assuming that no auxiliary winding open circuit fault is detected, controller U1 will then begin cycling power switch S1 during normal operation. It is during this normal operation that controller U1 will monitor the terminal 305 voltage to detect an over-voltage fault condition. For example, controller U1 may include a comparator for each over-voltage threshold. The resistance of resistors R1, R2, and R3 are then governed by the following expression:

$$V\_IN*(R2//R3)/(R1+R2//R3)=Vin\_MUL \qquad \text{Eq (3)}$$

where Vin_MUL is the terminal 305 voltage.

Controller U1 may react to a detection of an auxiliary winding open circuit fault in a number of fashions. For example, controller U1 may drive the terminal 305 voltage sufficiently high so that bleeder switch transistor S2 is switched on to discharge the input capacitor C1 (FIG. 1) and thus bring the input voltage to a safe level. Alternatively or in addition to switching on bleeder switch transistor S2, controller U1 may suspend the cycling of power switch transistor S1 while the over-voltage fault persists.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
   an input voltage rail for providing an input voltage to a primary winding of a transformer;
   a controller having an auxiliary winding and over-voltage fault terminal;
   a first voltage divider configured to couple a divided version of the input voltage to the auxiliary winding and over-voltage fault terminal and configured to couple a divided version of an auxiliary winding voltage to the auxiliary winding and over-voltage fault terminal; and
   a second voltage divider configured to divide the voltage for the auxiliary winding into a divided voltage, wherein the controller includes a feedback terminal for receiving the divided voltage, and wherein the controller is configured to compare a voltage for the auxiliary winding and over-voltage fault terminal to at least one over-voltage threshold to detect an over-voltage fault for the input voltage and is configured to control a cycling of a power switch transistor during a normal mode of operation responsive to the divided voltage, and is further configured to test for an open circuit fault for the auxiliary winding prior to the normal mode of operation responsive to a comparison of the divided voltage to an open circuit threshold voltage.

2. The flyback converter of claim 1, wherein the controller is further configured to test for the open circuit fault through an application of a testing voltage to the feedback terminal.

3. The flyback converter of claim 1, wherein the first voltage divider comprises:
   a first resistor connected between the input voltage rail and the auxiliary winding and over-voltage fault terminal; and
   a second resistor connected between the auxiliary winding and over-voltage fault terminal and ground.

4. The flyback converter of claim 3, wherein the first voltage divider further comprises a third resistor connected between the auxiliary winding and over-voltage fault terminal.

5. The flyback converter of claim 4, wherein a resistance of the first resistor is greater than a resistance of the second resistor, and wherein a resistance of the third resistor is greater than a resistance of the second resistor.

6. The flyback converter of claim 4, wherein the resistance of the first resistor is greater than twice the resistance of the second resistor, and wherein the resistance of the third resistor is greater than twice the resistance of the second resistor.

7. The flyback converter of claim 1, wherein the at least one over-voltage threshold comprises a plurality of over-voltage thresholds.

8. The flyback converter of claim 1, further comprising:
   a bleed switch transistor coupled between the input voltage rail and ground, wherein the controller is further configured to switch on the bleed switch transistor responsive to a detection of the over-voltage fault.

9. The flyback converter of claim 8, wherein the controller is further configured to stop the cycling of the power switch transistor during the normal mode of operation responsive to the detection of the over-voltage fault.

10. A method, comprising:
    in a first voltage divider, dividing the input voltage on a flyback converter input voltage rail for a flyback converter into a first divided voltage;
    in the first voltage divider, dividing an auxiliary winding voltage for the flyback converter into a second divided voltage;
    through a single terminal on a controller for the flyback converter, comparing the second divided voltage to at least one threshold voltage to determine whether the input voltage has an over-voltage fault;
    through a second voltage divider, dividing the auxiliary winding voltage into a third divided voltage;
    sensing the third divided voltage through a second terminal on the controller;
    controlling a cycling of a power switch for the flyback converter to regulate an output voltage responsive to the sensing of the third divided voltage; and
    switching on a bleeder switch responsive to the input voltage having the over-voltage fault to lower the input voltage.

11. The method of claim 10, further comprising:
    prior to the cycling of the power switch, driving a voltage from the controller into the single terminal to apply a test voltage to the second terminal;
    sensing the test voltage through the second terminal; and
    comparing the test voltage sensed through the second terminal to an open circuit threshold to determine whether an auxiliary winding has an open circuit fault.

12. The method of claim 10, further comprising:
    stopping the cycling of the power switch responsive to the input voltage having the over-voltage fault.

13. The method of claim 10, wherein lowering the input voltage further comprises draining charge from an input capacitor coupled to the input voltage rail.

14. The method of claim 10, wherein the at least one voltage threshold comprises a plurality of voltage thresholds.

15. The method of claim 10, further comprising filtering a voltage for the single terminal.

16. The method of claim 15, wherein filtering the voltage for the single terminal comprises smoothing the voltage for the single terminal through a capacitor.

\* \* \* \* \*